E. L. GREEN.
METALLIC RESILIENT TIRE.
APPLICATION FILED OCT. 23, 1915.
1,184,948.
Patented May 30, 1916.
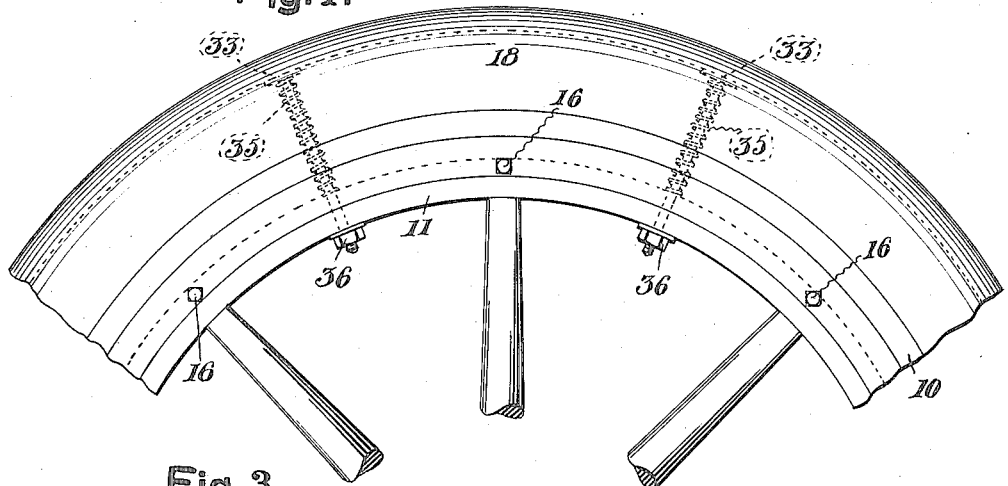
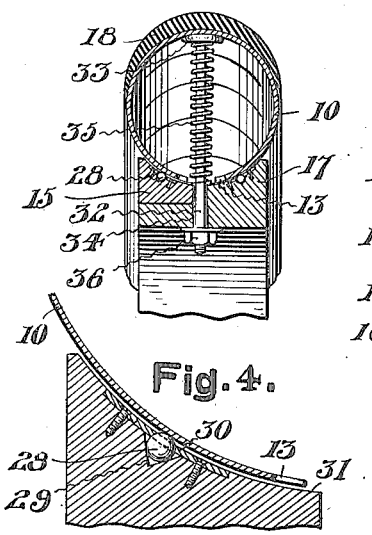
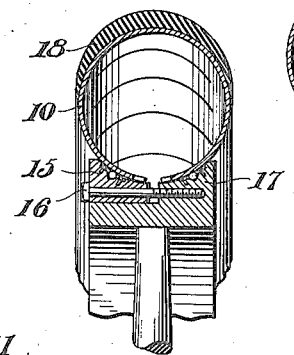
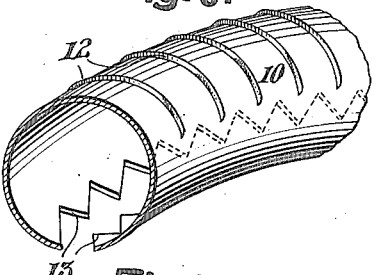
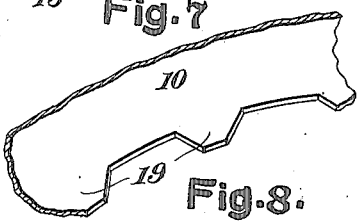
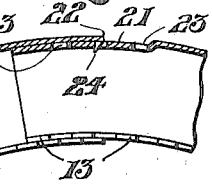
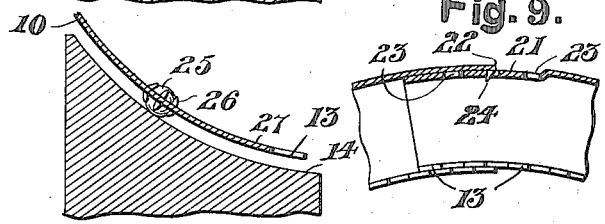
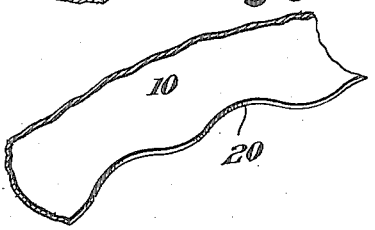
Inventor
E. L. Green
By T. R. Bryant.
Attorney

UNITED STATES PATENT OFFICE.

EDWARD L. GREEN, OF QUINCY, ILLINOIS.

METALLIC RESILIENT TIRE.

1,184,948. Specification of Letters Patent. Patented May 30, 1916.

Application filed October 23, 1915. Serial No. 57,452.

*To all whom it may concern:*

Be it known that I, EDWARD L. GREEN, a citizen of the United States, residing at Quincy, in the county of Adams and State of Illinois, have invented certain new and useful Improvements in Metallic Resilient Tires, of which the following is a specification.

This invention relates to certain new and useful improvements in metallic resilient tires.

The primary object of this invention is to provide a resilient tire for automobiles and other vehicles, the same possessing extreme durability and combining all essential qualities of a pneumatic tire and capable of employment upon the usual vehicle rim.

A further object of the device is to provide a tire carried ball bearing contact connection with a vehicle rim for allowing a more perfect accommodation of the tire during its operative movements when positioned thereon.

A still further object of the invention is to provide a split metallic telescoping tube tire adapted to be anti-frictionally mounted upon a vehicle rim and provided with resilient connectors between the rim and tire and having an outer flexible covering if desired.

With these general objects in view and others that will appear as the nature of the invention is better understood, the same consists in the novel combination and arrangement of parts hereinafter more fully described, illustrated in the accompanying drawings, and pointed out in the appended claims.

In the drawings forming a part of this application and in which like-designating characters refer to corresponding parts throughout the several views:—Figure 1 is a side elevation of a portion of a vehicle wheel provided with the present invention. Fig. 2 is a radial transverse sectional view thereof adjacent one of the wheel spokes. Fig. 3 is a similar view adjacent one of the tire connectors. Fig. 4 is an enlarged sectional detail view of an anti-friction means for the tire carried by the rim. Fig. 5 is a similar view showing the anti-friction means carried by the tire. Fig. 6 is a perspective view of a portion of the tire detached. Figs. 7 and 8 are perspective views of portions of a similar tire provided with different accommodating forms of adjacent edges, and Fig. 9 is a longitudinal sectional view, through the telescoping end connections of the tire.

It will be noted by referring to the drawings that the tire 10 consists of a flexible tubular metallic member bent into circular form for positioning upon the rim 11 of a wheel and having its free ends retained in telescoping relations as illustrated in Fig. 9, the said tube being preferably provided with transversely-arranged struck-up ribs 12 upon its tread portion allowing the tube to assume its circular arrangement, it being understood that the tube is severed upon its inner side and opposite the tread portion thereof and with its opposite edges 13 suitably notched and separated.

The rim 11 is provided with the usual peripheral groove 14 within which the tire 10 is mounted, the rim being preferably of the form having a removable flange 15 secured in operative position by means of a plurality of screws 16 extending through the flange 15 and retained within the opposite fixed flange 17 of the rim.

The tire 10 may be provided with a suitable covering 18 entirely enveloping the same or only attached to the tread portion thereof as herein illustrated and formed of a desirable material such as rubber, leather or canvas, while the afore-mentioned ribs 12 afford a traction surface for the tread of the tire 10 when the covering 18 is dispensed with. The edges 13 of the tire allow the latter to spring when under load and such edges will then slightly move toward and away from each other allowing sufficient play for the action of the tire, it being understood that instead of the V-shaped notches shown in Fig. 6, the spaced teeth 19 may be employed or the wavy edges 20 as illustrated respectively in Figs. 7 and 8 of the drawings.

With the tire 10 arranged in the form of a circle, one reduced end 21 thereof is adapted to be telescopingly received within the adjacent tire end 22 as illustrated in Fig. 9, the end 21 being provided with a plurality of slots 23 adjacent the tread of the tire and adapted for the reception of a projecting lug 24 carried by the inner face of the tread portion of the tire end 22. It will thus be seen that by forcing the tire end 21 within the end 22 that the lug 24 will become seated within one of the slots 23, thus locking the tire in its circular form upon the rim. The tire will thus be prevented from lengthening or expanding, while the contraction thereof will cause the said ends to telescope to a greater degree and allow the lug 24 to position itself within an adjacent slot 23.

For accommodating the movements of the tire during the traction pressures, it is desirable to provide anti-friction means between the tire and rim and this is preferably accomplished by journaling a plurality of metallic spheres or steel balls 25 within cages formed of struck-out fingers 26 in the adjacent edge portions 27 of the tire. Instead of providing the balls 25 carried directly by the tire 10, similar balls 28 may be carried by the flanges 15 and 17 if desired, instead of being mounted directly upon the tire and such arrangement is illustrated in Figs. 2, 3 and 4 of the drawings. The said balls 28 are positioned in angular recesses or races 29 in the said flanges, while cover plates 30 are arranged over the races being provided with openings therethrough for allowing the balls 28 to project in advance of the said plates 30, the latter being countersunk within and lying flush with the inner curved surfaces 31 of the said flanges.

A means is provided for retaining the tire upon the rim consisting of a plurality of bolts 32 each having a head 33 flatly engaging and secured to the interior surface of the tire at the tread portion thereof, each bolt 32 being slidably positioned through a radial opening 34 extending through the rim 11, and the heads 33 having detachable screw-threaded connections with the bolts 32. An expansion spring 35 encircles the bolt 32 and bears between the head 33 of the latter and the adjacent faces of the flanges 15 and 17, while a lock nut 36 is screw-threaded upon the inner end of the bolt 32 for retaining the same with the spring 35 suitably adjusted.

From this detailed description of the invention, the operation thereof will be apparent, the tire 10 being operatively mounted upon the flanges 15 and 17 in engagement with the anti-friction ball members positioned between the inner edge portions of the tire and the said flanges, and with the bolts 32 retaining the tire upon the rim. The exerting of traction pressure upon the tread portion of the tire 10 allows the bolts 32 to move inwardly, some of the load being taken by the springs 35, while the drawing together of the spaced edges of the tire allows the same to freely move upon the anti-friction members herein described. It will be understood also that the flange 15 may be readily removed by withdrawing the screws 16 and at which time the tire 10 may be removed from the rim and the lug 24 may be withdrawn from its receiving slot 23 if desired to separate the tire.

While the form of the invention herein shown and described is what is believed to be the preferred embodiment thereof, it is nevertheless to be understood that minor changes may be made therein without departing from the spirit and scope of the invention as claimed.

What I claim as new is:—

1. A device of the class described comprising in combination with a wheel rim having opposite tire-accommodating flanges, a metallic tubular tire having telescoping ends and positioned upon the said rim, the said tire being severed throughout its inner side forming opposite spaced side portions positioned adjacent the said flanges and anti-friction members rotatively mounted between each of the said flanges and side portions of the tire.

2. A device of the class described comprising a rim having opposite flanges provided with inner tire-receiving surfaces having ball races arranged therein, anti-friction balls rotatably retained within the said races, and a metallic tubular tire retained in shiftable seated position upon the said oppositely arranged balls.

3. A device of the class described comprising a rim having opposite flanges provided with inner tire-receiving surfaces having ball races arranged therein, anti-friction balls rotatably retained within the said races, a metal tube arranged in the form of a circle and having telescoping ends and slotted upon its inner side providing opposite coöperating edge portions shiftably mounted upon the said balls.

4. A device of the class described comprising a rim having opposite flanges provided with inner tire-receiving surfaces having ball races arranged therein, anti-friction balls rotatably retained within the said races, a metal tube arranged in the form of a circle and having telescoping ends and slotted upon its inner side providing opposite coöperating edge portions shiftably mounted upon the said balls, said rim being provided with radial openings therethrough, retaining headed bolts shiftably mounted through the said openings and attached to the interior surface of the tube, and encircling expansion springs carried by the said bolts having their ends engaging the heads thereof and the said flanges.

5. A device of the class described comprising a rim having opposite flanges provided with inner tire-receiving surfaces having ball races arranged therein, anti-friction balls rotatably retained within the said races, and a metallic tubular tire retained in shiftable seated position upon the said balls, the said rim being provided with radial openings therethrough, retaining headed bolts shiftably mounted through the said openings and attached to the interior surface of the tire, and encircling expansion springs carried by the said bolts having their outer ends engaging the heads thereof.

6. A device of the class described comprising a split tube of flexible material, the edges of the tube having accommodating cut-away notches, resilient retaining and positioning means secured to the inner surface of the tube and radially projecting from the center of the tube between the adjacent edges of the tube and anti-friction mounting means for the said tube.

In testimony whereof I affix my signature.

EDWARD L. GREEN.

Witnesses:
L. E. GIESING,
S. E. SIEHORN.